United States Patent [19]
Yap et al.

[11] Patent Number: 5,453,644
[45] Date of Patent: Sep. 26, 1995

[54] PERSONAL-CARE APPARATUS COMPRISING A CAPACITIVE ON/OFF SWITCH

[75] Inventors: Kok K. Yap; Boon C. Ler; Lim: Swee G., all of Singapore, Singapore

[73] Assignee: U.S. Philips Corporation, New York, N.Y.

[21] Appl. No.: 959,814

[22] Filed: Oct. 13, 1992

[30] Foreign Application Priority Data

Oct. 17, 1991 [EP] European Pat. Off. ............. 91202696

[51] Int. Cl.⁶ .......................... H01H 9/06; H01H 83/00
[52] U.S. Cl. ................... 307/116; 307/326; 327/517; 340/573; 200/61.85
[58] Field of Search ................... 307/116, 129, 307/308, 326–328; 361/179, 184, 181, 189, 190, 192; 200/61.85, 52 R; 192/129 R, 130, 131 R, 131 H, 129 A; 340/568, 573, 562; 328/5; 173/170; 34/96–101; 219/392, 383–385; 327/517, 509

[56] References Cited

U.S. PATENT DOCUMENTS

| | | | |
|---|---|---|---|
| 2,150,029 | 4/1937 | French | 219/257 |
| 2,343,654 | 12/1941 | Finlayson | 219/257 |
| 2,364,433 | 12/1941 | Finlayson | 219/257 |
| 2,366,014 | 12/1941 | Finlayson | 219/491 |
| 2,382,587 | 6/1942 | Thomas | 219/257 |
| 2,782,308 | 2/1957 | Rug | 307/308 |
| 2,848,659 | 8/1958 | Cutler | 361/179 |
| 3,254,313 | 2/1964 | Atkins et al. | 200/600 |
| 3,568,006 | 3/1971 | Atkins | 361/181 |
| 3,641,410 | 2/1972 | Vogelsberg | 388/838 |
| 3,651,391 | 3/1972 | Vogelsberg | 318/446 |
| 3,703,217 | 12/1972 | Kulick et al. | 200/51.57 |
| 3,798,462 | 3/1974 | Rizzo | 307/116 |
| 4,029,996 | 6/1977 | Miffitt | 307/116 |
| 4,203,101 | 5/1980 | Towsend | 200/61.85 |
| 4,531,287 | 7/1985 | Shibata et al. | 30/43.6 |
| 4,878,107 | 10/1989 | Hopper | 307/116 |
| 4,879,443 | 11/1989 | Carlucci et al. | 200/293.1 |
| 5,235,217 | 8/1993 | Kirton | 307/326 |
| 5,353,468 | 10/1994 | Yap et al. | 15/319 |

FOREIGN PATENT DOCUMENTS

| | | |
|---|---|---|
| 0052685 | 6/1982 | European Pat. Off. |
| 0062568 | 10/1982 | European Pat. Off. |
| 0127237 | 12/1984 | European Pat. Off. |
| 0152737 | 8/1985 | European Pat. Off. |
| 584981 | 2/1977 | Switzerland. |
| 2050609 | 1/1981 | United Kingdom. |
| 2054151 | 2/1981 | United Kingdom. |
| 2199962 | 7/1988 | United Kingdom. |
| 8203520 | 10/1982 | WIPO ............... H05B/1/02 |

Primary Examiner—A. D. Pellinen
Assistant Examiner—Richard T. Elms
Attorney, Agent, or Firm—Ernestine C. Bartlett

[57] ABSTRACT

A personal-care apparatus comprises a load (LD) and a switch (SW), which load (LD) and which switch (SW) are coupled in series between a first (1) and a second (2) supply terminal for receiving an alternating voltage, the personal-care apparatus further comprising a rectifying circuit (RC) for converting the alternating voltage into a direct voltage, and a safety circuit (SC), which is coupled between a third (3) and a fourth (4) supply terminal for receiving the direct voltage and which comprises a capacitive sensor (CS) for the detection of the presence of a part of a human body in the proximity of the personal-care apparatus, the safety circuit being adapted to control the switch (SW) in response to said detection.

29 Claims, 3 Drawing Sheets

5,453,644

PERSONAL-CARE APPARATUS COMPRISING A CAPACITIVE ON/OFF SWITCH

BACKGROUND OF THE INVENTION

The invention relates to a personal-care apparatus comprising a load and a switch, which load and which switch are coupled in series between a first and a second supply terminal for receiving an alternating voltage.

Such a personal-Care apparatus can be, for example, a hair dryer, the load comprising a heater and a fan, and the switch being arranged to turn ON/OFF the alternating voltage across the load.

DESCRIPTION OF THE PRIOR ART

Such a personal-care apparatus is generally known, the load often comprising a motor and the alternating voltage being usually the mains voltage.

When, in a first example, such a personal-care apparatus is constructed as a toothbrush, the toothbrush is sometimes briefly put aside with the alternating voltage applied across the load. However, in such a short time the toothbrush may fall as a result of vibrations caused by the motor, which may give rise to both electrical and mechanical defects of the toothbrush.

When, in a second example, such a personal-care apparatus is constructed as a hair dryer, the hair dryer is often briefly put aside with the alternating voltage applied across the load. However, in such a short time the hair dryer may cause a fire as a result of heat developed by the heater, for example when the hair dryer is placed on flammable surface. Moreover, the hair dryer may fall as a result of vibrations caused by the fan, as a result of which the hair dryer, similarly to the toothbrush, may become defective and the hair dryer may cause a fire as a result of heat developed by the heater, for example in the case when such a dryer falls on a flammable carpet.

SUMMARY OF THE INVENTION

An object of the invention is to provide a personal-care apparatus which precludes the above-mentioned undesirable situations.

A personal-care apparatus in accordance with the invention is characterized in that the personal-care apparatus further comprises a rectifying circuit for converting the alternating voltage into a direct voltage, and a safety circuit, which is coupled between a third and a fourth supply terminal for receiving the direct voltage and which comprises a capacitive sensor for detecting of the presence of a part of a human body in the proximity of the personal-care apparatus. The safety circuit is adapted to control the switch in response to the detection of the presence of a human body part. Whereas the rectifying circuit is needed for the power supply of the safety circuit, a first advantage of the personal-care apparatus in accordance with the invention is obtained in that the safety circuit ensures that the apparatus is switched ON/OFF depending on the active use of the apparatus, which active use is detected by a capacitive sensor for detecting the presence of a pan of the human body in the proximity of the apparatus. Thus, when a personal-care apparatus in accordance with the invention is briefly put aside the capacitive sensor will detect the absence of a pan of the human body in the proximity of the apparatus, in response to which, the safety circuit turns OFF the alternating voltage across the load. A second advantage of the personal-care apparatus in accordance with the invention is that the power consumption of the apparatus is reduced because the alternating voltage across the load is turned OFF.

A first embodiment of a personal-care apparatus in accordance with the invention, which apparatus comprises a handle, may be characterized in that the capacitive sensor is arranged near the handle. Since the capacitive sensor is adapted to detect the presence of a pan of a human body near the personal-care apparatus, it is advantageous to arrange the capacitive sensor near its handle.

A second embodiment of a personal-care apparatus in accordance with the invention may be characterized in that the safety circuit further comprises includes (i) a first oscillator comprising a capacitor, which is constituted by the capacitive sensor, and an output, (ii) a frequency-to-control-signal converter having an input coupled to the output of the first oscillator and having an output, and (iii) a first switching element having a control current path coupled to the output of the frequency-to-signal converter and having a main current path coupled to the switch. In the present embodiment of a personal-care apparatus in accordance with the invention the proximity of a pan of the human body causes a change in capacitance of the capacitor formed by the capacitive sensor, which change is converted into a frequency variation of an electric signal generated by the first oscillator, which frequency variation can be used advantageously for controlling the switch. For controlling the switch the present embodiment comprises the frequency-to-control-signal converter, by means of which frequency-to-control-signal converter the frequency variation of the electric signal is converted into a control signal for the first switching element, in response to which control signal the switching element turns the switch ON/OFF.

A third embodiment of a personal-care apparatus in accordance with the invention may be characterized in that the safety circuit further comprises an indicator element for generating a warning signal, which indicator element is serially coupled to the main current path of the first switching element. The indicator element has the advantage that in the present embodiment of the personal-care apparatus in accordance with the invention the ON/OFF switch setting is indicated visually and/or audibly.

A fourth embodiment of a personal-care apparatus in accordance with the invention may be characterized in that the safety circuit further comprises a second oscillator comprising a capacitor and an output, and a second switching element having a control current path coupled to the output of the second oscillator and having a main current path parallelly coupled to the main current path of the first switching element. On the basis of the capacitor the second oscillator generates a signal by means of which the second switching element is continually switched ON/OFF. Thus, when the first switching element is switched off the second switching element will turn on/OFF the indicator element, which is coupled in series with the main current paths of the switching elements, on the basis of which turn-ON/OFF a user of the personal-care apparatus can discern that the apparatus is in a standby state. Conversely, when the first switching element is ON this first switching element will turn on the indicator element, on the basis of which turn-ON a user of the personal-care apparatus can discern that the apparatus is in an active state.

A fifth embodiment of a personal-care apparatus in accordance with the invention may be characterized in that the switch has a control current path serially coupled to the main current path of the first switching element and having a main current path by which the switch is serially coupled to the load. The present embodiment provides a very simple way of controlling the switch, which switch, provided with the control current path and the main current path, may be constructed, for example, by means of a relay.

A sixth embodiment of a personal-care apparatus in accordance with the invention may be characterized in that the personal-care apparatus further comprises an interrupt switch for switching ON/OFF the load in the case that the switch is in the ON-state. An advantage of the interrupt switch is that the personal-care apparatus can be switched OFF when the apparatus should be in the ON-state on the basis of the detection of a part of the human body. For example, if the personal-care apparatus in accordance with the invention is a hair dryer, the interrupt switch enables a hand-held apparatus to be switched OFF briefly, for example for briefly combing the hair. The interrupt switch can be constructed simply by means of a push-to-interrupt switch coupled in series with the main current path of the first switching element or with the main current path of the switch.

BRIEF DESCRIPTION OF THE DRAWING

The above and other (more detailed) features of the invention will be described more elaborately with reference to the accompanying drawings, in which.

DETAILED DESCRIPTION OF THE PREFERRED EMBODIMENTS

Figure 1:
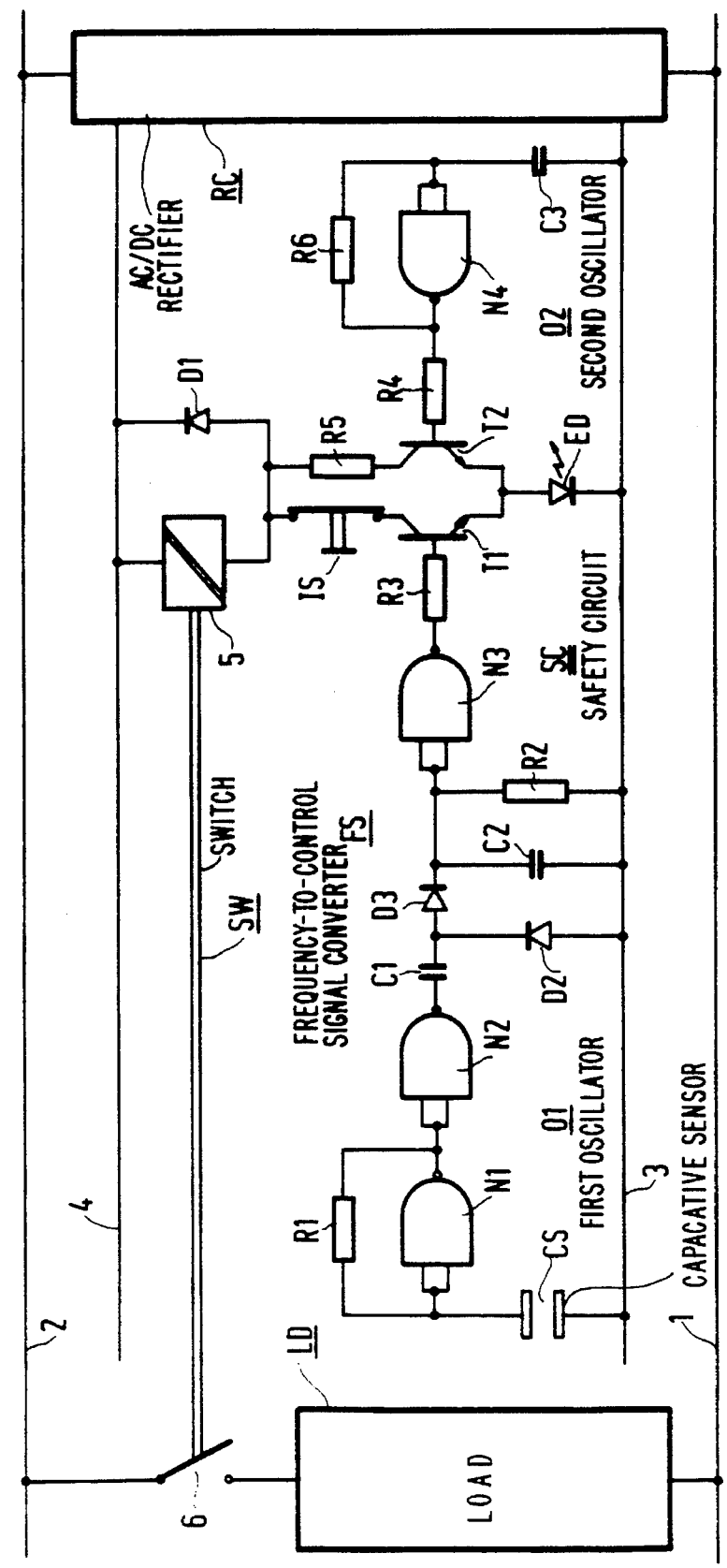
FIG. 1 shows a relevant part of a first embodiment of a personal-care apparatus in accordance with the invention.

FIG. 1 shows a relevant part of a first embodiment of a personal-care apparatus in accordance with the invention. The relevant part comprises a load LD and a switch SW serially coupled between a first supply terminal 1 and a second supply terminal 2 for the application of an alternating voltage, a rectifying circuit RC for converting the alternating voltage into a direct voltage, and a safety circuit SC coupled between a third supply terminal 3 and a fourth supply terminal 4 for the application of the direct voltage. Since the load LD and the rectifying circuit RC can be constructed in numerous known manners, which manners are not relevant to the present invention, FIG. 1 does not show any details of the load LD and the rectifying circuit RC.

The load LD can be constructed, for example, by means of a heater and a fan if the apparatus is, for example, a hair dryer, or by means of a motor if the apparatus is, for example, an electric toothbrush.

The rectifying circuit RC can be constructed, for example, by means of a diode bridge circuit coupled to the supply terminals 1 and 2 for the receiving alternating voltage and to the supply terminals 3 and 4 for supplying the direct voltage, having a capacitor coupled between the supply terminals 3 and 4 to smooth the direct voltage, and having a zener diode coupled between the supply terminals 3 and 4 to stabilize the direct voltage, which diode bridge circuit can be coupled, for example, to the supply terminals 1 and 2 by means of a first and a second power resistor in order to reduce the alternating voltage applied to the diode bridge circuit.

In the present embodiment the switch SW is constructed by means of a relay having a control current path 5 coupled to the safety circuit SC and a main current path 6, which main current path 6 couples the switch SW in series with the load LD. To protect the relay against an induction current produced after turning OFF of the switch SW formed by the relay, a diode D1 is coupled in parallel with the control current path 5 of the relay.

Figure 3:
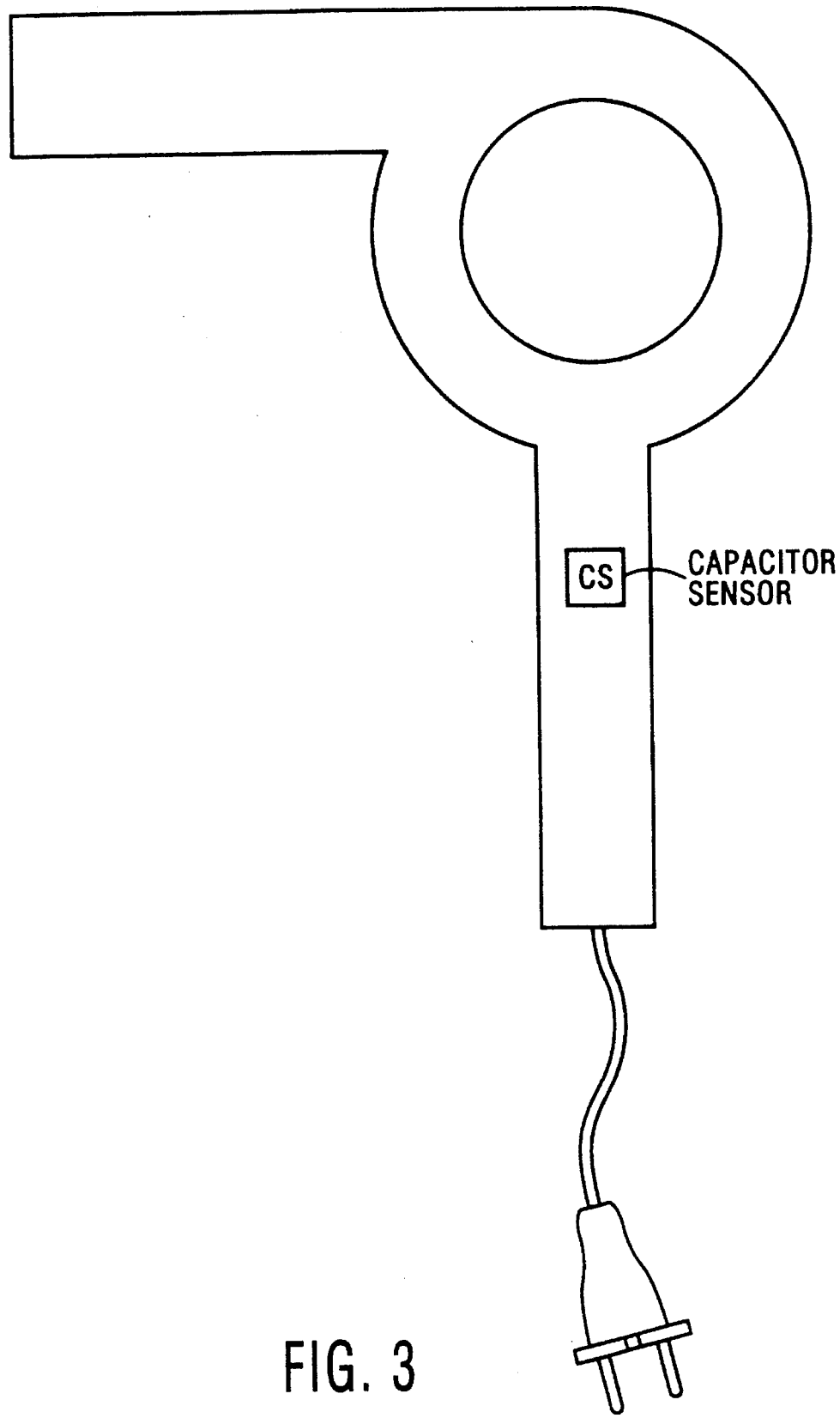
FIG. 3 shows a hair dryer having the capacitive sensor located in the handle.

The safety circuit SC in the present embodiment comprises an oscillator O1, a frequency-to-control-signal converter FS, a first switching element (T1, N3, R3), a second oscillator O2, a second switching element (T2, R4, R5), an interrupt switch IS, and an indicator element (ED), the oscillator O1, in accordance with the invention, comprising a capacitive sensor CS for the detection of a part of a human body in the proximity of the personal-care apparatus, the safety circuit SC being adapted to control the switch SW in response to this detection. Since a personal-care apparatus is generally held by means of a handle it is advantageous to arrange the capacitive sensor CS near as in the handle as shown in FIG. 3, the capacitive sensor CS being constructed, for example, by means of a first capacitor plate, arranged in or on the handle of the apparatus, and a second capacitor plate, coupled to the supply terminal 3. Although the second capacitor plate, similarly to the first capacitor plate, can be arranged in or on the handle, the physical presence of the second capacitor plate is not necessary in the case of a mains-powered apparatus. As a matter of fact, if the capacitive sensor CS only comprises the first capacitor plate, the first capacitor plate constitutes a capacitance to earth via a part of the human body near the apparatus, which capacitance to earth is coupled to the supply terminal 3 via the mains voltage and the rectifying circuit RC. Whereas the capacitive sensor CS comprising the first capacitor plate has the advantage that the relevant sensor can be constructed simply and cheaply, the capacitive sensor CS, regardless of its construction, in comparison with for example an optical or a resistive sensor, has the advantage that detection by the capacitive sensor CS is not affected by, for example, soiling of the capacitive sensor CS.

In addition to the capacitive sensor CS the oscillator O1 comprises a NAND-gate N1, a NAND-gate N2, and a resistor R1, the NAND-gate N1 having interconnected inputs coupled to the supply terminal 3 by means of the capacitive sensor CS and having an output coupled to its inputs by means of the resistor R1, the NAND-gate N2 having interconnected inputs coupled to the output of the NAND-gate N1 and having an output. The frequency-to-control-signal converter FS comprises a capacitor C1, a diode D2, a diode D3, a capacitor C2, and a resistor R2. The capacitor C1 and the diode D2 being serially coupled between the output of the NAND-gate N2 and the supply terminal 3, the capacitor C2 and the diode D3 being serially coupled between the supply terminal 3 and a point situated between the capacitor C1 and the diode D2, the resistor R2 being coupled in parallel with the capacitor C2. The first switching element (T1, N3, R3) comprises a transistor T1 having a base, a collector and an emitter, a NAND-gate N3, and a resistor R3. The NAND-gate N3 having interconnected inputs coupled to a point situated between the diode D3 and the capacitor C2 and having an output coupled to the base of the transistor T1 by means of the resistor R3. The second oscillator O2 comprises a NAND-gate N4, a capacitor C3 and a resistor R6, the NAND-gate N4 having interconnected inputs coupled to the supply terminal 3 by means of the capacitor C3 and having an output coupled to its inputs by means of the resistor R6. The second switching element (T2, R4, K5) comprises a transistor T2 having a base, a collector and an emitter, a resistor R4 coupled between the output of the NAND-gate N4 and the base of the transistor T2, and a resistor R5 coupled between the collector of the transistor T2 and the collector of the transistor T1, the collector of the transistor T1 being coupled to the supply terminal 4 by means of the parallel arrangement of the control current path 5 of the relay and the diode D1, the emitter of the transistor T2 being coupled to the emitter of the transistor T1. In the present embodiment the interrupt switch IS, which is capable of switching ON/OFF the load LD when the switch SW is ON, is coupled between the collector of the transistor T1 and the parallel arrangement of the control current path 5 of the relay and the diode D1. In the present embodiment the indicator element (ED) is constructed by means of a light-emitting diode ED coupled between the emitters of the transistors T1 and T2 and the supply terminal 3.

The oscillators O1 and O2 play a central role in the operation of the present embodiment. When the supply terminals 1 and 2 are connected to an alternating voltage, for example the mains voltage, a direct voltage generated by the rectifying circuit RC is applied to the safety circuit SC coupled to the supply terminals 3 and 4.

In a standby state of the personal-care apparatus, in which state the switch SW formed by the relay is in the OFF-position, the oscillators O1 and O2, which are energized with the direct voltage, will oscillate. The oscillator O1 generates an electric signal whose frequency is related to a capacitance of the capacitive sensor CS, the capacitive sensor CS being charged and discharged continually via the resistor R1 across the NAND-gate N1. By means of the NAND-gate N2, which constitutes a buffer, the electric signal is applied to the frequency-to-control-signal converter FS, which converter converts the electric signal into a control signal. In the standby state the control signal has such a value that the transistor T1 is not conductive. The capacitor C1 consequently transfers the electric signal generated by the oscillator O1, after which the diodes D2 and D3 rectify the signal and subsequently the capacitor C2 delivers a smoothed control signal. In the same way as the oscillator O1 the oscillator O2 generates an electric signal which has a frequency related to a capacitance of the capacitor C3, the capacitor C3 being charged and discharged continually via the resistor R6 across the NAND-gate N4. The electric signal generated by the oscillator O2 is applied to the base of the transistor T2 and causes the transistor T2 to be turned ON and turned OFF continually. In the standby state, in which the transistor T1 is cut off, turning ON and OFF of the transistor T2 results in a current which causes the light-emitting diode ED to blink, the switch SW formed by the relay not being turned ON by the current, which is limited by the resistor R5. The limited current is not necessary, for example, if the collector of the transistor T2 is coupled directly to the supply terminal 4.

In the active state of the personal-care apparatus, in which state the apparatus is for example held in a hand, the capacitance of the capacitive sensor CS has a value which differs from that in the standby state, as a result of which the oscillator O1 generates an electric signal of lower frequency which differs from that in the standby state. As in the standby state the electric signal is applied to the frequency-to-control-signal converter FS, which converter converts the electric signal into the control signal. In the active state the control signal has such a value that the transistor T1 conducts. As a result of this, the capacitor C1 blocks the electric signal generated by the oscillator O1, the resistor R2 ensuring that the capacitor C2 is discharged rapidly. As the transistor T1 is conductive a current flows through this transistor, which current causes the light-emitting diode ED to light up, the current switching on the switch SW formed by the relay and applying an alternating voltage across the load LD. In the active state the current can be interrupted by means of the interrupt switch IS, the switch SW formed by the relay being switched OFF. Thus, the interrupt switch IS has the advantage that the user of an apparatus provided with the safety circuit SC can briefly switch OFF the apparatus during the active state. Since in the active state, as in the standby state, the oscillator O2 turns the transistor T2 ON/OFF, the light-emitting diode ED will light up intermittently instead of continuously when the interrupt switch IS is activated. Although in the present embodiment the interrupt switch IS is coupled between the collector of the transistor T1 and the control current path 5 of the relay, the interrupt switch IS may be arranged at several other locations, for example in series with the main current path 6 of the relay.

Figure 2:
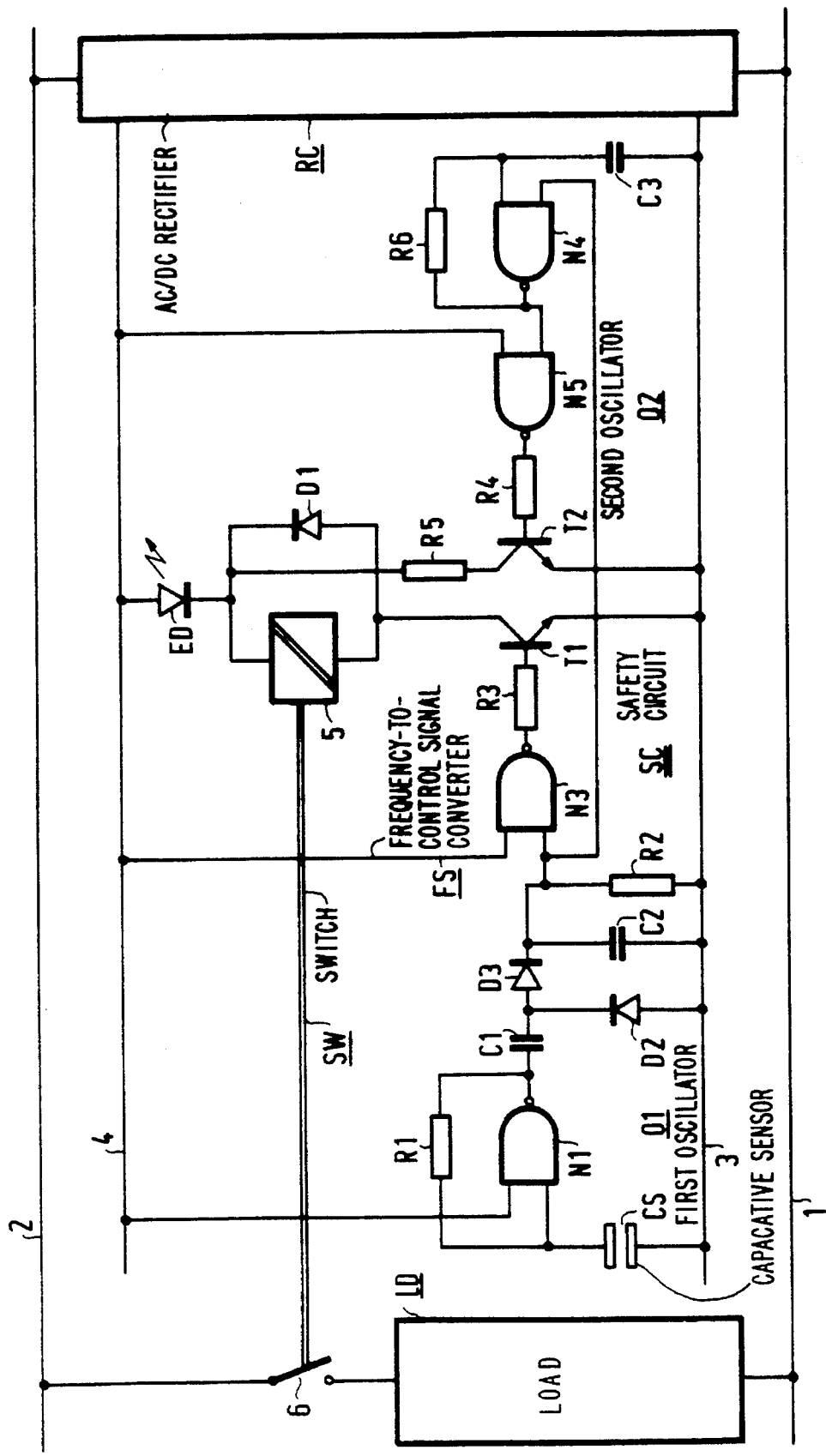
FIG. 2 shows a relevant part of a second embodiment of a personal-care apparatus in accordance with the invention.

FIG. 2 shows a relevant part of a second embodiment of a personal-care apparatus in accordance with the invention. The relevant part differs from that of the embodiment shown in FIG. 1 in several features, illustrating the large number of possible constructions of the safety circuit SC. A first feature is that the NAND-gate N2 is dispensed with and a NAND-gate N5 is included. The NAND-gate N5 has a first input coupled to the output of the NAND-gate N4, a second input coupled to the supply terminal 4, and an output coupled to the base of the transistor T2 by a resistor R4. The NAND-gate N5 has a buffer function similarly to the NAND-gates N2 and N3 shown in FIG. 1. The NAND-gates can be constructed advantageously by means of a single integrated circuit. A second feature relates to the NAND-gates N1 and N3, which like the NAND-gate N5 have an input coupled to the supply terminal 4. As the NAND-gates shown in FIGS. 1 and 2 are each arranged as an inverter, the inputs which are not essential for the operation may be coupled to one another or to the supply terminal 4. A third feature is that the indicator element formed by the light-emitting diode ED has been transferred to another location. In the present embodiment the light-emitting diode ED is coupled between the supply terminal 4 and the parallel arrangement of the control current path 5 of the relay and of the diode D1. A fourth feature concerns the NAND-gate N4 and the resistor R5, which NAND-gate has an input coupled to the point situated between the diode D3 and the capacitor C2, the resistor R5 being coupled directly to the light-emitting diode ED. Since the input of the NAND-gate N4 is coupled to the relevant point, the oscillator O2 is switched OFF when the transistor T1 is turned ON. A fifth feature is that the interrupt switch is dispensed with, although this interrupt switch can be arranged at several locations in the relevant part of the personal-care apparatus.

The invention is not limited to the embodiments shown herein. Within the scope of the invention several modifications are conceivable to those skilled in the art. Thus, the switch, the oscillators, the frequency-to-signal converter, the switching elements and the indicator element can be constructed in many ways which differ from the embodiments shown. For example, the switch can be constructed by means of a triac having a control current path coupled to the switching elements and having a main current path coupled in series with the load. Moreover, the control current path of the switch can be coupled to the main current paths of the switching elements at another point, for example between the main current paths of the switching elements and the third supply terminal. The indicator element may be constructed, for example, by means of a lamp or a sound reproducer and may readily be arranged at another location in the safety circuit SC, for example between the main current paths of the switching elements and the control current path of the switch. Another possibility is to implement the indicator element by means of two light-emitting diodes, for example light-emitting diodes of different color, which light-emitting diodes may be coupled for example serially to the respective main current paths of the switching elements. A further possibility is to implement the indicator element by means of a light-emitting diode and a sound reproducer, which may be useful for example for deaf and blind people.

We claim:

1. A personal-care apparatus including means for being held by a user, comprising:

first and second supply terminals for receiving an alternating voltage;

a load;

a switch coupled to the load for activating and deactivating the load by controlling the alternating voltage to the load, the load and the switch being coupled in series between the first and the second supply terminals;

a rectifying circuit having third and fourth supply terminals, for converting the alternating voltage into a direct voltage and for supplying the direct voltage across the third and fourth supply terminals; and a safety circuit coupled between the third and fourth supply terminals for receiving the direct voltage, the safety circuit including (i) a capacitive sensor for detecting the presence of a human body part in proximity to the personal-care apparatus, and (ii) means for controlling the switch such that the load is activated if the capacitive sensor senses a user holding the personal-care apparatus and the load is deactivated if the capacitive sensor senses that the user is no longer holding the personal-care apparatus, regardless of the orientation of the personal-care apparatus.

2. A personal-care apparatus as claimed in claim 1, which apparatus comprises a handle, characterized in that the capacitive sensor is arranged near the handle.

3. A personal-care apparatus as claimed in claim 2, wherein the safety circuit further comprises (i) a first oscillator including the capacitive sensor, and an output, (ii) a frequency-to-control-signal converter having an input coupled to the output of the first oscillator and having an output, and (iii) a first switching element having a control current path coupled to the output of the frequency-to-control-signal converter and having a main current path coupled to the switch.

4. A personal-care apparatus as claimed in claim 2, wherein the personal-care apparatus further comprises an interrupt switch operable for switching ON and OFF the load when the switch is in a state which activates the load.

5. A personal-care apparatus as claimed in claim 1, characterized in that the safety circuit further comprises (i) a first oscillator including the capacitive sensor, and an output, (ii) a frequency-to-control-signal converter having an input coupled to the output of the first oscillator and having an output, and (iii) a first switching element having a control current path coupled to the output of the frequency-to-control-signal converter and having a main current path coupled to the switch.

6. A personal-care apparatus as claimed in claim 5, characterized in that the safety circuit further comprises (i) a second oscillator including a capacitor and an output, and (ii) a second switching element having a control current path coupled to the output of the second oscillator and having a main current path coupled in parallel with the main current path of the first switching element.

7. A personal care apparatus as claimed in claim 6, wherein the switch includes a control current path serially coupled to the main current path of the first switching element, and a main current path coupled to the load.

8. A personal-care apparatus as claimed in claim 6, wherein the personal-care apparatus further comprises an interrupt switch operable for switching ON and OFF the load when the switch is in a state which activates the load.

9. A personal-care apparatus as claimed in claim 5 wherein the personal-care apparatus further comprises an interrupt switch operable for switching ON and OFF the load when the switch is in a state which activates the load.

10. A personal-care apparatus as claimed in claim 1 characterized in that the personal-care apparatus further comprises an interrupt switch operable for switching ON and OFF the load when the switch is in a state which activates the load.

11. A personal-care apparatus as claimed in claim 5, characterized in that the safety circuit further comprises an indicator element for generating a warning signal, the indicator element being serially coupled to the main current path of the first switching element.

12. A personal-care apparatus as claimed in claim 11 wherein the safety circuit further comprises (i) a second oscillator including a capacitor and an output, and (ii) a second switching element having a control current path coupled to the output of the second oscillator and having a main current path coupled in parallel with the main current path of the first switching element.

13. A personal care apparatus as claimed in claim 11, wherein the switch includes a control current path serially coupled to the main current path of the first switching element, and a main current path coupled to the load.

14. A personal-care apparatus as claimed in claim 11, wherein the personal-care apparatus further comprises an interrupt switch operable for switching ON and OFF the load when the switch is in a state which activates the load.

15. A personal-care apparatus as claimed in claim 5, characterized in that the switch includes a control current path serially coupled to the main current path of the first switching element, and a main current path coupled to the load.

16. A personal-care apparatus as claimed in claim 15, wherein the personal-care apparatus further comprises an interrupt switch operable for switching ON and OFF the load when the switch is in a state which activates the load.

17. A safety circuit for use in a personal-care apparatus including (i) means for being held by a user, (ii) first and second supply terminals for receiving an alternating voltage, (iii) a load, (iv) a switch coupled to the load for activating and deactivating the load by controlling the alternating voltage to the load, the load and the switch being coupled in series between the first and the second supply terminals, and (iv) a rectifying circuit having third and fourth supply terminals, for converting the alternating voltage into a direct voltage and for supplying the direct voltage across the third and fourth supply terminals, the safety circuit being coupled between the third and the fourth supply terminals and comprising:

a capacitive sensor for detecting the presence of a human body part in proximity to the personal-care apparatus; and means for controlling the switch such that the load is activated if the capacitive sensor senses a user holding the personal-care apparatus and the load is deactivated if the capacitive sensor senses that the user is no longer holding the personal-care apparatus, regardless of the orientation of the personal-care apparatus.

18. A safety-circuit as claimed in claim 17, wherein the means for being held by a user comprises a handle and the capacitive sensor is arranged near the handle.

19. A safety-circuit as claimed in claim 17, characterized in that the safety circuit further comprises (i) a first oscillator including the capacitive sensor and an output, (ii) a frequency-to-control-signal converter having an input coupled to the output of the first oscillator and having an output, and (iii) a first switching element having a control current path coupled to the output of the frequency-to-control signal converter and having a main current path coupled to the switch.

20. A safety-circuit as claimed in claim 19, characterized in that the safety circuit further comprises an indicator element for generating a warning signal, the indicator element being serially coupled to the main current path of the first switching element.

21. A safety-circuit as claimed in claim 19, characterized in that the safety circuit further comprises (i) a second oscillator including a capacitor and an output, and (ii) a second switching element having a control current path coupled to the output of the second oscillator and having a main current path coupled in parallel with the main current path of the first switching element.

22. A safety-circuit as claimed in claim 19, characterized in that the switch includes a control current path serially coupled to the main current path of the first switching element, and a main current path coupled to the load.

23. A safety-circuit as claimed in claim 17, characterized in that the personal-care apparatus further comprises an interrupt switch operable for switching ON and OFF the load when the switch is in a state which activates the load.

24. A personal care apparatus including means for being held by a user, comprising:

first and second supply terminals for receiving an alternating voltage;

a load;

a switch coupled to the load for activating and deactivating the load by controlling the alternating voltage to the load, the load and the switch being coupled in series between the first and the second supply terminals;

a rectifying circuit having third and fourth supply terminals, for converting the alternating voltage into a direct voltage and for supplying the direct voltage across the third and fourth supply terminals; and a safety circuit coupled between the third and the fourth supply terminals for receiving the direct voltage, the safety circuit including (i) a capacitive sensor for detecting the presence of a human body part in proximity to the personal-care apparatus, (ii) a first oscillator having an output and including the capacitive sensor, for oscillating at a first frequency and supplying a first signal to its output if the capacitive sensor senses a human body part in proximity to the personal-care apparatus, and for oscillating at a second frequency and supplying a second signal to its output if the capacitive sensor does not sense a human body part in proximity to the personal care apparatus, and (iii) a frequency-to-control-signal converter coupled to the first oscillator for receiving the first and second signals and for converting the first and second signals to a first and a second control signal respectively, which control signals control the switch such that the alternating voltage is supplied to the load if the first control signal is generated by the frequency-to-control signal converter which indicates the user has picked up the personal care apparatus, and for causing the alternating voltage to be removed from the load if the second control signal is generated by the frequency-to-control signal converter which indicates the user is no longer holding the personal care apparatus.

25. A personal care apparatus as claimed in claim 24, wherein the frequency-to-control signal converter includes a first capacitor coupled to the first oscillator, a diode coupled to the first capacitor, and a second capacitor coupled to the diode and wherein the first capacitor is chosen such that only one of the first and second signals is passed by the first capacitor, the passed signal being restored to a DC level by the diode, the second capacitor being charged by the DC level to produce the first control signal, and the second control signal being produced by the second capacitor not being charged.

26. A personal care apparatus as claimed in claim 25, wherein the safety circuit further includes a first switching element coupled to receive the first and the second control signals, and having a main current path coupled to the switch.

27. A personal care apparatus according to claim 25, wherein the capacitive sensor includes a first plate coupled to the means for being held.

28. A personal care apparatus according to claim 26, wherein the safety circuit further comprises an indicator element, for generating a warning signal, the indicator element being serially coupled to the main current path of the first switching element.

29. A portable personal-care apparatus including means for being held by a user, comprising:

a first and a second supply terminal for receiving a alternating voltage;

a load;

a switch, the load and the switch being coupled in series between the first and the second supply terminals;

a rectifying circuit having third and fourth supply terminals, for converting the alternating voltage into a direct voltage and for supplying the direct voltage between the third and fourth supply terminals; and a safety circuit coupled between the third and fourth supply terminals for receiving the direct voltage, the safety circuit including a capacitive sensor for detecting the presence of a human hand and being adapted to control the switch so as to enable activation of the apparatus when the apparatus is picked up by a user and so as to deactivate the apparatus when the user is no longer holding the apparatus, regardless of the orientation of the apparatus.

\* \* \* \* \*